United States Patent
Itoh

(10) Patent No.: US 7,480,125 B2
(45) Date of Patent: Jan. 20, 2009

(54) CONSTANT VOLTAGE CIRCUIT, SYSTEM POWER DEVICE AND METHOD OF CONTROLLING SYSTEM POWER DEVICE

(75) Inventor: Kohzoh Itoh, Hyogo-ken (JP)

(73) Assignee: Ricoh Company, Ltd. (JP)

( * ) Notice: Subject to any disclaimer, the term of this patent is extended or adjusted under 35 U.S.C. 154(b) by 12 days.

(21) Appl. No.: 11/474,366

(22) Filed: Jun. 26, 2006

(65) Prior Publication Data
US 2006/0291111 A1    Dec. 28, 2006

(30) Foreign Application Priority Data
Jun. 24, 2005    (JP) ............................. 2005-185221

(51) Int. Cl.
*H02H 3/00* (2006.01)
(52) U.S. Cl. ........................ 361/87; 361/93.8; 361/100; 323/282
(58) Field of Classification Search ................ 361/93.8, 361/100; 323/282
See application file for complete search history.

(56) References Cited

U.S. PATENT DOCUMENTS 4,528,610 A * 7/1985 Payne ........................... 361/62
5,859,757 A * 1/1999 Hanafusa et al. ............. 361/100
2005/0184715 A1* 8/2005 Kidokoro et al. ............. 323/282

FOREIGN PATENT DOCUMENTS

| JP | 4-184606 | 7/1992 |
| JP | 2002-312044 | 10/2002 |

OTHER PUBLICATIONS

IEEE, The Authoritative Dictionary of IEEE Standards Terms, 2000, Standards Information Network IEEE Press, Seven Edition, 124.*

* cited by examiner

*Primary Examiner*—Michael J Sherry
*Assistant Examiner*—Tien Mai
(74) *Attorney, Agent, or Firm*—Dickstein Shapiro LLP

(57) ABSTRACT

A constant voltage circuit including an input terminal to receive an input voltage, an output terminal configured to output a constant voltage converted from the input voltage to a load and an overcurrent protection circuit portion to perform an overcurrent protection operation of restricting an output current from the output terminal within a threshold current and to generate and provide logic signals including information on an operation state of the overcurrent protection operation to a control device disposed outside the constant voltage circuit to control the load based on the information.

20 Claims, 14 Drawing Sheets

CONSTANT VOLTAGE CIRCUIT, SYSTEM POWER DEVICE AND METHOD OF CONTROLLING SYSTEM POWER DEVICE

BACKGROUND OF THE INVENTION

1. Field of the Invention

The present invention relates to a constant voltage circuit including an overcurrent protection circuit, a system power device including multiple constant voltage circuits, and a method of controlling the system power device and more particularly to an overcurrent protection circuit for protecting a semiconductor IC in which constant voltage circuits are integrated from overcurrent, high temperature, etc.

2 Discussion of the Background

When constant voltage circuits using series regulators are integrated in an IC, it is typical to attach an output transistor outside the IC since the output transistor consumes great power. However, in the case of when output current is relatively small, for example, in the magnitude of a couple of hundreds mA, output transistors tend to be integrated in the same chip with other circuits for size reduction. Especially, in the case of when a number of series regulators are integrated in one chip, i.e., a system power chip, it is highly effective to build in the system power chip in an output transistor. As a protection device for a constant voltage circuit using a series regulator, an overcurrent protection circuit is typically used to prevent an overcurrent, which is an output current greater than a limit.

FIG. 14 is a circuit diagram illustrating a typical example of a constant voltage circuit having an overcurrent protection circuit.

In FIG. 14, a constant voltage circuit 100 includes a reference voltage generating circuit 101 for generating a reference voltage Vref, an error amplifying circuit A101, an output transistor M101, resistances R101 and R102 for detecting an output current, an output current restriction circuit 102 for restricting the output current from the output transistor M101 and a short circuit current restriction circuit 103 for restricting a short circuit current, which is an output current iout of when an output terminal OUT short-circuits. Since the currents flowing in the resistance R101 and R102 are small and ignorable, the output current from the output transistor M101 is treated to be equal to the output current iout.

Since the drain current of an NMS transistor M105 is the same as the drain current of a PMOS transistor M102, the drain current of an NMOS transistor M106 is a current in proportion to the output current from the transistor M101.

The drain current of the NMOS transistor M106 flows in a resistance R103. Therefore, the voltage drop of the resistance R103 increases as the output current iout increases. When the voltage drop surpasses the threshold voltage of a PMOS transistor M103, the PMOS transistor M103 is turned on and reduces the decrease of the gate voltage of the output transistor M101, thereby restricting the output current iout.

The short circuit restriction circuit 103 includes an operating amplifier circuit A102, PMOS transistors M111 and M112 and a resistance R104.

When the output current restriction circuit 102 starts operating, the output voltage Vout decreases, and a voltage Va at the connection of the resistances R101 and R102 is equal to the voltage drop of the resistance R103, the output voltage from the operating amplifying circuit A102 decreases, resulting in the decrease of the gate voltage of the PMOS transistor M112 Thereby, the PMOS transistor M112 is turned on and the decrease in the gate voltage of the output transistor M101 is restricted. But, there is a difference between both circuits 102 and the operating amplifying circuit A102. That is, in the operating amplifying circuit A102, a voltage Va, which is compared with the voltage drop of the resistance R104, is in proportion to the output voltage Vout so that the current restriction function works to a relatively small output current as the output voltage Vout decreases. Therefore, the output current iout decreases as the output voltage Vout decreases. The input circuit of the operating amplifying circuit A102 has an offset voltage in order that the short circuit current is not 0 A during short circuit. Namely, a short circuit current flows from the output terminal OUT even during short circuit.

In addition, as atypical example, unexamined published Japanese patent application No. (hereinafter referred to as JOP) H04-184606 describes a constant voltage circuit having an overheat protection circuit. The output voltage of the constant voltage circuit is reduced by the output of the overheat protection circuit when the temperature thereof surpasses a limit. JOP 2002-312044 describes a constant voltage circuit which outputs a signal indicating overheat to the central processing unit (CPU) when the output current therefrom and the temperature exceed respective limits.

FIG. 15 is a block chart illustrating a usage example of the constant voltage circuit illustrated in FIG. 14.

In FIG. 15, the constant voltage circuit 100 supplies a voltage to a load 110, which is operated and controlled by a control device 111. When the load 110 is a memory and the control device 111 is a CPU, the memory does not operate when the overcurrent protection circuit of the constant voltage circuit 100 operates and thereby the short circuit current is supplied to the memory 110. However, the CPU 111 does not have a device to acquire information about the state of the memory 100, which may be a drawback because the memory 110 not in activation can freeze the CPU 111.

SUMMARY OF THE INVENTION

Because of these reasons, the present inventor recognizes that a need exists for a constant voltage circuit which can output a signal indicating the operation state of the overcurrent protection circuit so that the control device for controlling a load to which a voltage is supplied from the constant voltage circuit can detect the state of the load, a system power device including a plurality of the constant voltage circuits and a method of controlling the system power device. The present invention is thus made.

Accordingly, an object of the present invention is to provide a constant voltage circuit which can output a signal indicating the operation state of the overcurrent protection circuit so that the control device for controlling a load to which a voltage is supplied from the constant voltage circuit can detect the state of the load, a system power device including a plurality of the constant voltage circuits and a method of controlling the system power device. Briefly this object and other objects of the present invention as hereinafter described will become more readily apparent and can be attained, either individually or in combination thereof, by a constant voltage circuit including an input terminal to receive an input voltage, an output terminal configured to output a constant voltage converted from the input voltage to a load, and an overcurrent protection circuit portion performing an overcurrent protection operation of restricting an output current from the output terminal within a threshold current and generating and providing logic signals including information on the operation state of the overcurrent protection operation to a control device disposed outside the constant voltage circuit to control the load based on the information.

It is preferred that, in the constant voltage circuit mentioned above, the overcurrent protection circuit portion further includes at least one of an output current restriction circuit and a short circuit current restriction circuit. The output current restriction circuit restricts the output current within the threshold current when the output current reaches the threshold current and generates and provides logic signals including information on the operation state of the output current restriction circuit to the control device. The short circuit current restriction circuit lowers a voltage at the output terminal and the output current when the output current reaches the threshold current in such a manner that the output current of when the voltage at the output terminal decreases to a grounding voltage is equal to a predetermined short circuit current and generates and provides logic signals including information on the operation state of the short circuit current restriction circuit to the control device.

It is still further preferred that the constant voltage circuit mentioned above further includes an output voltage control portion to generate a reference voltage and a proportion voltage in proportion to the voltage at the output terminal and control an output transistor in such a manner that the proportion voltage is equal to the reference voltage. The overcurrent protection circuit portion restricts the output current from the output transistor.

It is still further preferred that, in the constant voltage circuit mentioned above, the output transistor, the output voltage control portion and the overcurrent protection circuit portion are integrated in one integrated circuit.

As another aspect of the present invention, a system power device is provided which includes at least two constant voltage circuits, each of which includes an input terminal to supply an input voltage, an output terminal to output a constant voltage converted from the input voltage to a load, and an overcurrent protection circuit portion to perform an overcurrent protection operation of restricting an output current from the output terminal within a threshold current and to generate and provide logic signals including information on the operation state of the overcurrent protection operation to a control device disposed outside the constant voltage circuit to control the load based on the information.

It is preferred that, in the system power device mentioned above, the overcurrent protection circuit portion further includes at least one of an output current restriction circuit and a short circuit current restriction circuit. The output current restriction circuit restricts the output current within the threshold current when the output current reaches the threshold current and generates and provides logic signals including information on the operation state of the output current restriction circuit to the control device. The short circuit current restriction circuit lowers a voltage at the output terminal and the output current when the output current reaches the threshold current in such a manner that the output current of when the voltage at the output terminal decreases to the grounding voltage is equal to a predetermined short circuit current and generates and provides logic signals including information on the operation state of the short circuit current restriction circuit to the control device.

It is still further preferred that, in the system power device mentioned above, the overcurrent protection circuit portion further includes the operation state detection circuit which generates and provides logical signals to the control device when at least one of the output current restriction circuit and the short circuit current restriction circuit are turned on.

It is still further preferred that, in the system power device mentioned above, each constant voltage circuit further includes an output voltage control portion which generates a reference voltage and a proportion voltage in proportion to the voltage at the output terminal and controls an output transistor in such a manner that the proportion voltage is equal to the reference voltage. The overcurrent protection circuit portion restricts the output current from the output transistor.

It is still further preferred that the system power device mentioned above further includes a detection circuit which detects the operation state of the overcurrent circuit portion of each constant voltage circuit and outputs logic signals when at least one overcurrent circuit portion thereof are turned on.

It is still further preferred that the system power device mentioned above includes a control circuit which stops the operation of each constant voltage circuit when the temperature of the perimeter of each constant voltage circuit detected by the temperature detection circuit is not lower than the threshold temperature while at least one of the overcurrent protection circuit portions of the constant voltage circuits are turned on.

It is still further preferred that the system power device mentioned above includes a control circuit which controls operations against each overcurrent protection circuit portion in respective constant voltage circuit such that the threshold current for the output current of the overcurrent protection circuit in operation is reduced when the temperature of each constant voltage circuit detected by the temperature detection circuit is not lower than the threshold temperature while at least one of the overcurrent protection circuit portions of the constant voltage circuits are turned on.

It is still further preferred that, in the system power device mentioned above, each constant voltage circuit is integrated in one integrated circuit.

It is still further preferred that, in the system power device mentioned above, each constant voltage circuit and detection circuit are integrated in one integrated circuit.

It is still further preferred that the system power device mentioned above includes a temperature detection circuit which detects a temperature of each constant voltage circuit and generates and outputs a signal on whether the detected temperature is not lower than a threshold temperature, and wherein each constant voltage circuit, detection circuit and temperature detection circuit are integrated in one integrated circuit.

It is still further preferred that the system power device mentioned above includes a temperature detection circuit which detects the temperature of each constant voltage circuit and generates and outputs a signal on whether the detected temperature is not lower than the threshold temperature, and a control circuit which stops the operation of each constant voltage circuit when the temperature of the perimeter of each constant voltage circuit detected by the temperature detection circuit is not lower than the threshold temperature while at least one of the overcurrent protection circuit portions of the constant voltage circuits are turned on. Further, each constant voltage circuit, detection circuit, temperature detection circuit and control circuit are integrated in one integrated circuit.

It is still further preferred that the system power device mentioned above includes a temperature detection circuit which detects a temperature of each constant voltage circuit and generates and outputs a signal on whether the detected temperature is not lower than a threshold temperature, and a control circuit which controls operations against each overcurrent protection circuit portion in respective constant voltage circuit such that the threshold current for the output current of the overcurrent protection circuit in operation is reduced when the temperature of each constant voltage circuit detected by the temperature detection circuit is not lower than the threshold temperature while at least one of the overcurrent protection circuit portions of the constant voltage circuits are turned on. Further, each constant voltage circuit, detection circuit, temperature detection circuit and control circuit are integrated in one integrated circuit.

As another aspect of the present invention, a method of controlling a system power device including a plurality of constant voltage circuits mentioned above is provided. The method includes detecting the temperature of each constant voltage circuit, and stopping operation of each constant voltage circuit when the detected temperature is not lower than a threshold temperature and at least one of the constant voltage circuit performs overcurrent protection operation.

As another aspect of the present invention, another method of controlling a system power device including a plurality of constant voltage circuits mentioned above is provided. The method includes detecting the temperature of each constant voltage circuit and controlling operations of each constant voltage circuit such that a threshold current for the output current of the overcurrent protection circuit in operation is reduced when the temperature of each constant voltage circuit detected by the temperature detection circuit is not lower than a threshold temperature while at least one of the overcurrent protection circuit portions of the constant voltage circuits are turned on.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The present invention will be described below in detail with reference to several embodiments and accompanying drawings.

Figure 1:
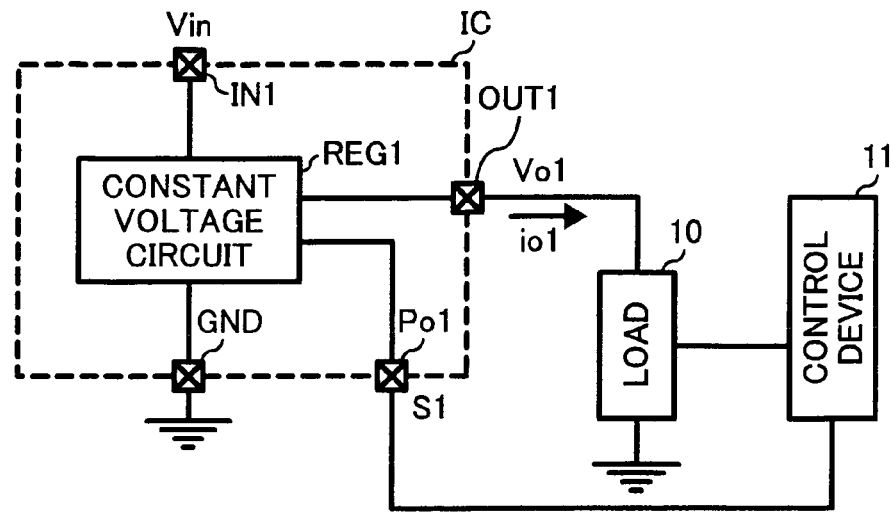
FIG. 1 is a diagram illustrating an application example of the constant voltage circuit of the present invention.

FIG. 1 is a diagram illustrating an application example of the constant voltage circuit of the present invention.

In FIG. 1, a constant voltage circuit REG1 converts an input voltage Vin input into an input terminal IN1 to a constant voltage. The constant voltage is supplied to a load 10 via an output terminal OUT1. The constant voltage circuit REG1 includes an overcurrent protection circuit which restricts the current supplied to the load 10 to a value not greater than the limit, i.e., threshold, of overcurrent protection current and short-circuits the output terminal OUT1 to the ground voltage when the current supplied to the load 10 surpasses the limit of overcurrent protection current. The constant voltage circuit REG1 is integrated in one IC, which includes the input terminal IN1, the output terminal OUT1, a terminal Po1 and a grounding terminal GND. The constant voltage circuit REG1 must not necessarily be integrated in one IC.

The constant voltage circuit REG1 generates a signal S1 indicating the operation state of the overcurrent protection, which is output via the terminal Po1. The signal S1 is output to a control device 11 for operating and controlling the load 10. The control device 11 can acquire information about the state of the load 10 by detecting from the signal S1 the operation state of the overcurrent protection circuit of the constant voltage circuit REG1. Therefore, the control device 11 can suitably control the load 10 according to the state thereof. It is thus possible to prevent a drawback which occurs when the control device 11 operates in a normal way the load 10 in the state in which the overcurrent protection circuit of the constant voltage circuit REG1 operates.

Figure 2:
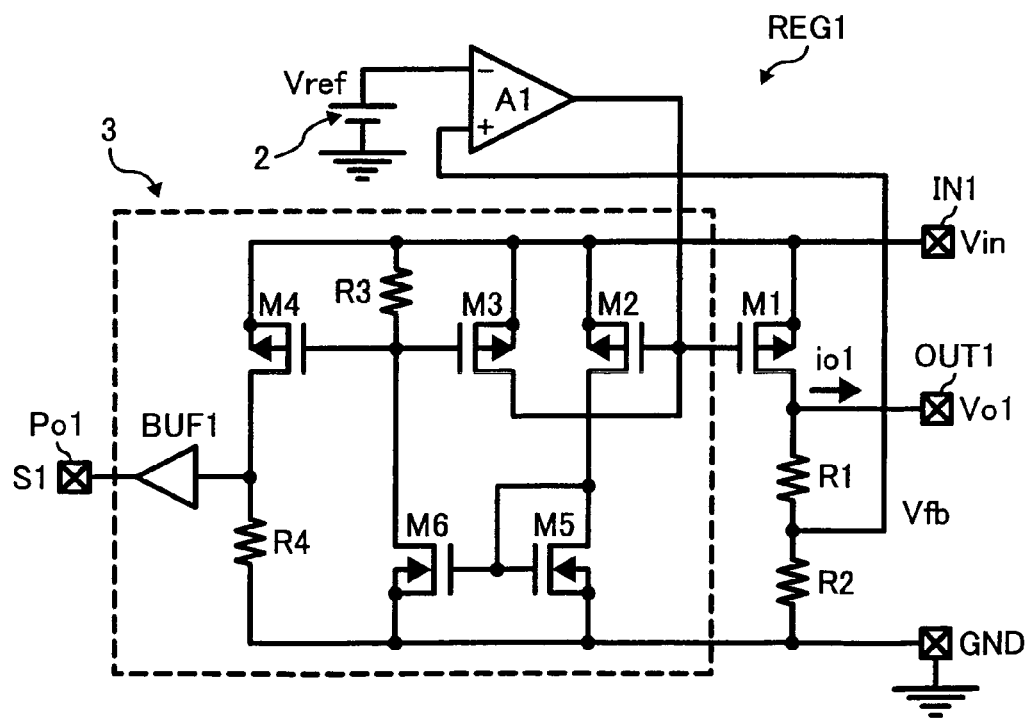
FIG. 2 is a diagram illustrating an example of the constant voltage circuit of the present invention.

FIG. 2 is a circuit diagram illustrating an example of the constant voltage circuit REG1 illustrated in FIG. 1. In the example in FIG. 2, an output current restriction circuit is used as the overcurrent protection circuit.

In FIG. 2, the constant voltage circuit REG1 includes a reference voltage generating circuit 2 for generating and outputting a reference voltage Vref, an error amplifying circuit A1, an output transistor M1 including a PMOS transistor, resistances R1 and R2 for detecting the output voltage and an output current restriction circuit 3 forming an overcurrent generating circuit. The reference voltage generating circuit 2, the error amplifying circuit A1 and the resistances R1 and R2 form an output voltage control portion.

The output current control circuit 3 includes a buffer BUF1, PMOS transistors M2 to M4, NMOS transistors M5 and M6 and resistances R3 and R4.

Between the input terminal IN1 and the output terminal OUT1 is connected the output transistor M1. The resistances R1 and R2 are tandem connected between the output terminal OUT1 and the grounding terminal GND, which is connected to the grounding voltage. The resistances R1 and R2 separate an output voltage Vo1 to generate a separated voltage Vfb, which is output to a non-inversion input end of the error amplifying circuit A1. To an inversion input end thereof is input the reference voltage Vref. The error amplifying circuit A1 operates and controls the output transistor M1 in such a manner that the separated voltage Vfb is equal to the reference voltage Vref.

In the output current restriction circuit 3, the PMOS transistor M2 and the NMOS transistor M5 are serially connected between the input terminal IN1 and the grounding terminal GND. The gate of the PMOS transistor M2 is connected to the gate of the output transistor M1. The NMOS transistors M5 and M6 form a current mirror circuit. Each gate thereof is connected to each other and the connection portion is connected to the drain of the NMOS transistor M5. The source of the NMOS transistor M6 is connected to the grounding terminal GND. Between the input terminal IN1 and the drain of the NMOS transistor M6 is connected the resistance R3.

The connection portion of the resistance R3 and the NMOS transistor M6 is connected to each gate of the PMOS transistors M3 and M4. In addition, the PMOS transistor M3 is connected between the input terminal IN1 and the gate of the output transistor M1. The PMOS transistor M4 and the resistance R4 are serially connected between the input terminal IN1 and the grounding terminal GND. The connection portion of the PMOS transistor M4 and the resistance R4 is connected to the input end of the buffer BUF1. The output end of the buffer BUF1 is connected to the terminal Po1. Since the currents flowing in the resistance R1 and R2 are small and ignorable, the output current from the output transistor M1 is treated to be equal to the output current io1.

In the structure described above, when the output current io1 surpasses the overcurrent protection current, the output current restriction circuit 3 restricts the output current io1 to the overcurrent protection current to reduce the output voltage Vo1.

When the output current io1 is less than the overcurrent protection current, the drain current of the NMOS transistor M6 is small and the voltage drop of the resistance the resistance R3. Therefore, the PMOS transistors M3 and M4 are off. Therefore, the output current restriction circuit 3 does not perform the overcurrent protection operation and the input voltage of the buffer BUF1 is a low level. Then, the signal S1 of the low level indicating that the overcurrent protection operation is not performed is output from the terminal Po1. Further, when the output io1 reaches the overcurrent protection current, the drain current of the NMOS transistor M6 increases and the voltage drop of the resistance R3 surpasses each threshold of the PMOS transistors M3 and M4. Therefore, the PMOS transistors M3 and M4 are on. When the PMOS transistor M3 is on, the gate voltage of the output transistor is controlled to restrict the output current io1. When the PMOS transistor M4 is on, the input voltage of the buffer BUF1 is a high level. The buffer BUF1 outputs the signal S1 of the high level from the terminal Po1.

Figure 3:
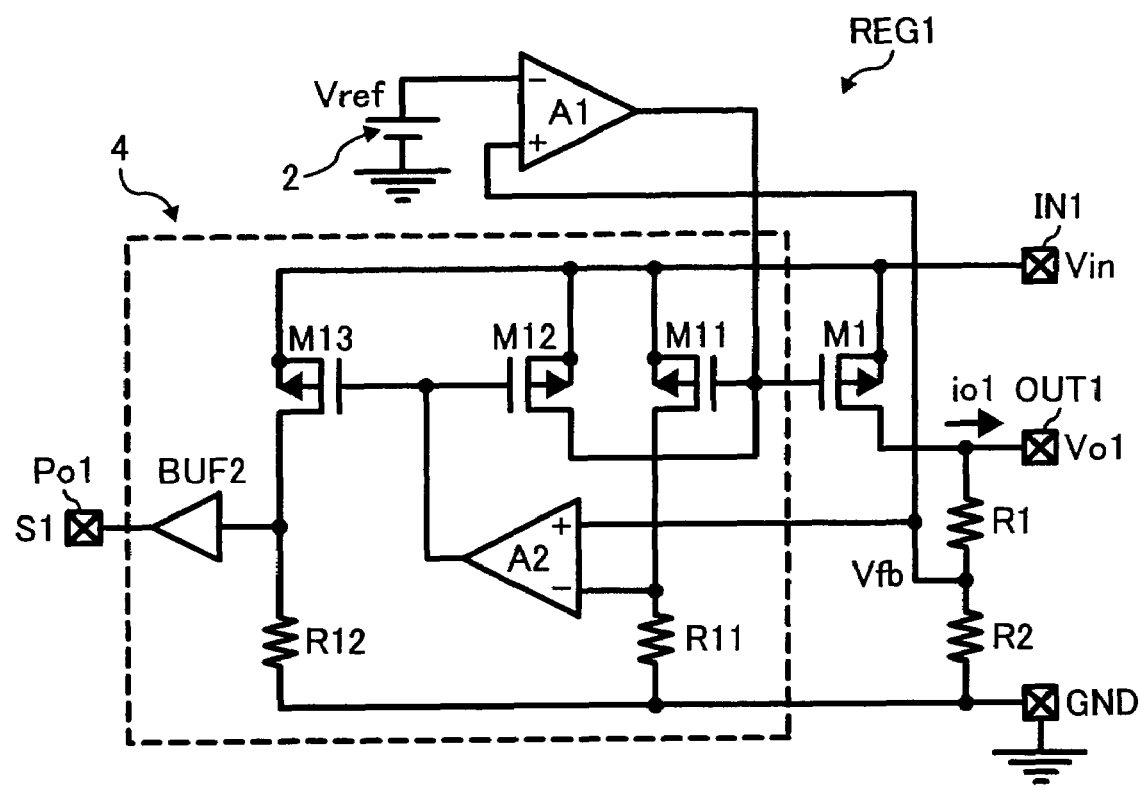
FIG. 3 is a diagram illustrating another example of the constant voltage circuit of the present invention.

Next, FIG. 3 is a circuit diagram illustrating another example of the constant voltage circuit REG1 illustrated in FIG. 1. In the example illustrated in FIG. 3, a short circuit current restriction circuit is used as the overcurrent protection circuit. The elements in FIG. 3 corresponding to those in FIG. 2 are represented by the same reference numerals and not repeatedly described. The description is limited to the difference between the examples, which is the short circuit current restriction circuit.

In FIG. 3, the constant voltage circuit REG1 includes the reference voltage generating circuit 2, the error amplifying circuit A1, the output transistor M1, the resistances R1 and R2 and a short circuit current restriction circuit 4 functioning as the overcurrent protection circuit.

The short circuit current restriction circuit 4 includes an operating amplifying circuit A2, a buffer BUF 2, PMOS transistors M11 to M13 and resistances R11 and R12.

In the short circuit current restriction circuit 4, the PMOS transistor M11 and the resistance R11 are serially connected between the input terminal IN1 and the grounding terminal GND and the gate of the PMOS transistor M11 is connected to the gate of the output transistor M1. The connection portion of the PMOS transistor M11 and the resistance R11 is connected to an inversion end of the operating amplifying circuit A2. The separated voltage Vfb is input at the non-inversion end of the operating amplifying circuit A2. The PMOS transistor M12 is connected between the input terminal IN1 and the output transistor M1. Each gate of the PMOS transistors M12 and M13 is connected to each other. The connected portion is connected to the output end of the operating amplifying circuit A2. In addition, the PMOS transistor M12 and the resistance R12 are serially connected between the input terminal IN1 and the grounding terminal GND. The connection portion of the PMOS transistor M13 and the resistance 12 is connected to the input end of the buffer BUF2. The output end of the buffer BUF2 is connected to the terminal Po1.

In the structure described above, when the output current io1 surpasses the overcurrent protection current, the short circuit current restriction circuit 4 reduces the output current io1 by reducing the output voltage Vo1 in such a way that the output current io1 obtained when the output voltage Vo1 becomes the grounding voltage is equal to the short circuit current.

When the separated voltage Vfb is equal to the voltage drop of the resistance R11, the output voltage of the operating amplifying circuit A2 decreases so that the gate voltage of the PMOS transistor M12 decreases. Therefore, the PMOS transistor M12 is turned on and the decrease in the gate voltage of the output transistor M1 is restricted. But, there is a difference between both circuits 3 and 4. That is, the separated Vfb, which is compared with the voltage drop of the resistance 11, is in proportion to the output voltage Vo1 so that the current restriction function works to a relatively small output current as the output voltage Vo1 decreases. Therefore, the output current io1 decreases as the output voltage Vo1 decreases. The input circuit of the operating amplifying circuit A2 has an offset voltage in order that the short circuit current is not 0 A during short circuit. Namely, some short circuit current flows even during short circuit.

When the output current io1 is under the overcurrent protection current, the output of the operating amplifying circuit A2 is high and the PMOS transistors M12 and M13 are off. The input signals of the buffer BUF 2 and the terminal Po1 are at a low level.

When the output current io1 reaches the overcurrent protection current, the output signal of the operating amplifying circuit A2 is at a low level and the PMOS transistor M13 is on. The input signals of the buffer BUF2 and the terminal Po1 are at a high level.

As described above, when the short circuit current restriction circuit 4 starts operation and performs the overcurrent protection operation, the terminal Po1 outputs the signal S1 of a high level. When the short circuit current restriction circuit 4 does not perform the overcurrent protection operation, the terminal Po1 outputs the signal S1 of a low level.

Figure 4:
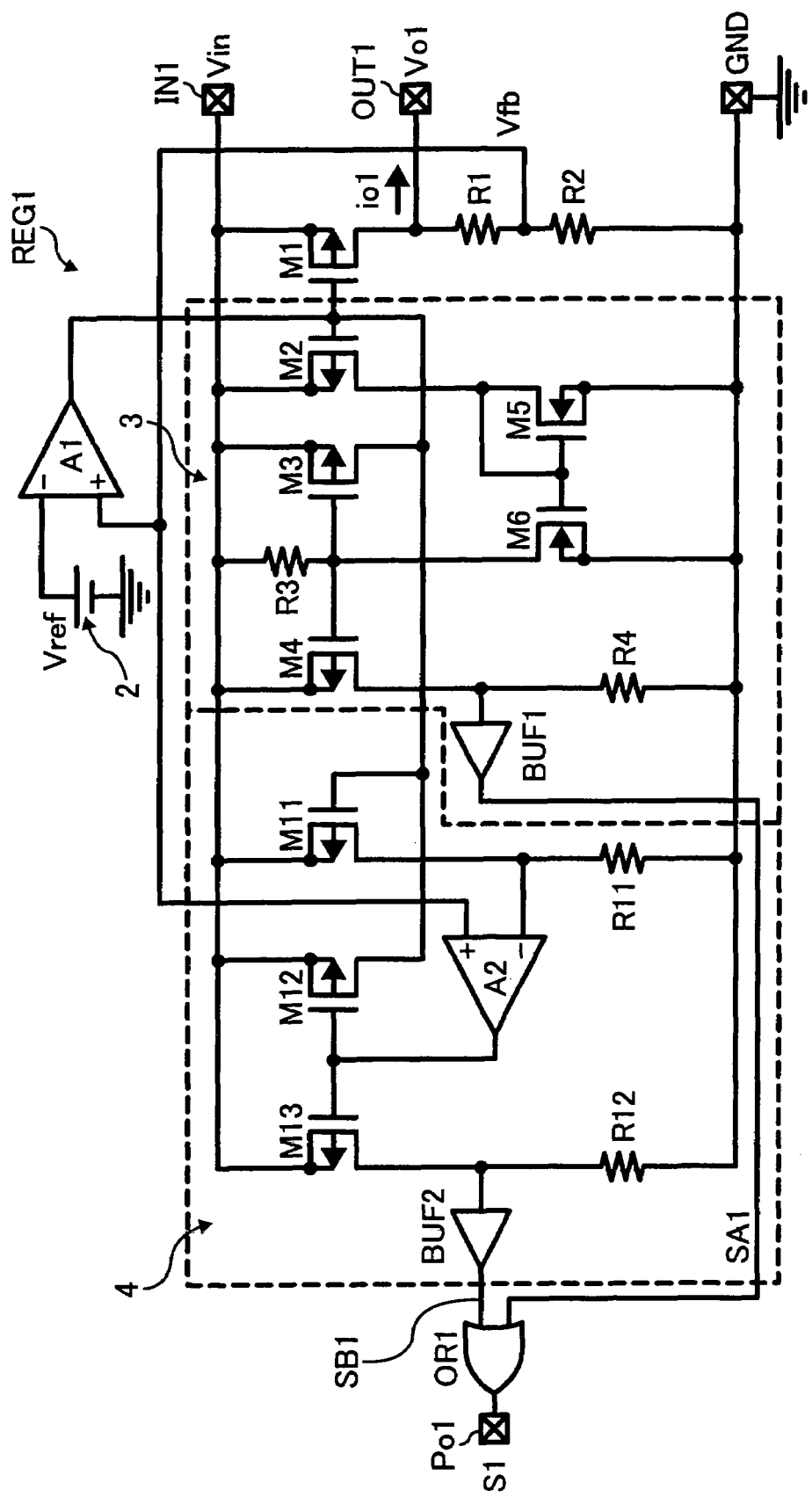
FIG. 4 is a diagram illustrating another example of the constant voltage circuit of the present invention.

The constant voltage circuit REG1 can also include both the output current restriction circuit 3 illustrated in FIG. 2 and the short circuit current restriction circuit 4 illustrated in FIG. 3. FIG. 4 is a circuit diagram illustrating an example of the case. In FIG. 4, the elements common in FIG. 4 and FIGS. 2 and 3 are illustrated by the corresponding reference numerals and not repeatedly described. The description for the example illustrated in FIG. 4 is limited to the difference therebetween.

In FIG. 4, the constant voltage circuit REG1 includes the reference voltage generating circuit 2, the error amplifying circuit A1, the output transistor M1, the resistances R1 and R2, the output current restriction circuit 3, the short circuit current restriction circuit 4 and an OR circuit OR1. The OR circuit OR1 is an operation state detection circuit.

The output end of the buffer BUF 1 of the output current restriction circuit 3 and the output end of the buffer BUF 2 of the short circuit current restriction circuit 4 are connected to corresponding input ends of the OR circuit OR1. The output end of the OR circuit OR1 is connected to the terminal Po1.

In the structure described above, when the output current restriction circuit 3 and/or the short circuit current restriction circuit 4 are in operation, the signal S1 of a high level is output from the terminal Po1. When both the output current restriction circuit 3 and the short circuit current restriction circuit 4 are not in operation, the signal S1 of a low level is output from the terminal Po1.

It is also possible to output each output signal SA1 and SB1 of the buffer BUF 11 and the buffer BUF2 to the outside not via the OR circuit OR1. Thereby, the control device 11 provided outside can acquire information on which of the output current restriction circuit 3 and the short circuit current restriction circuit 4 is now in operation.

Figure 5:
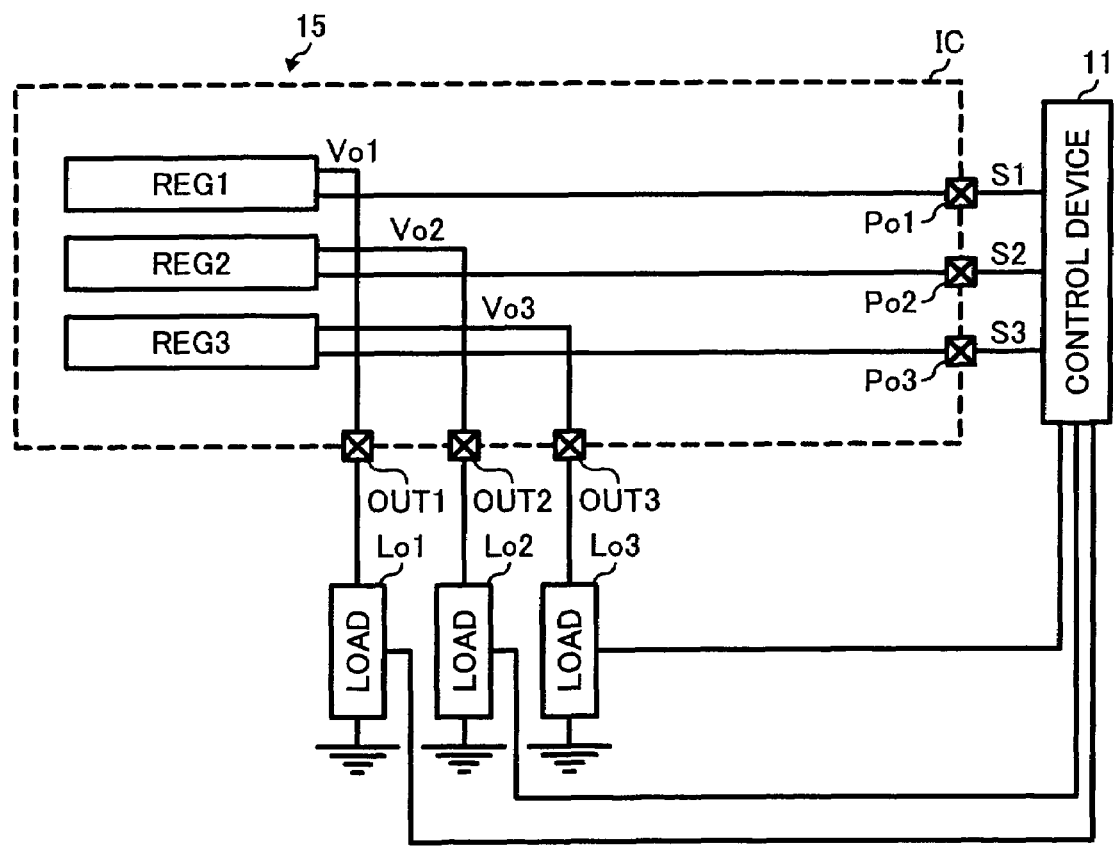
FIG. 5 is a diagram illustrating an example of the system power device constant voltage circuit of the present invention.

Each example described above illustrates only the cases in which only one constant voltage circuit REG1 is provided. However, as illustrated in FIG. 5, in the case of a system power device including a plurality of constant voltage circuits, for example, a constant voltage circuit 15 including three constant voltage circuits REG1 to REG3, terminals Po1 to Po3 corresponding to each constant voltage circuit REG1 to REG3 are provided. The terminals Po1 to Po3 can be set to output signals S1 to S3, respectively. In addition, each constant voltage circuit REG1 to REG3 has the structure illustrated in FIG. 4, it is possible to output signals SA1 to SA3 and SB1 and SB3 therefrom.

Thereby, the control device 11 provided outside can acquire information on whether the overcurrent protection operation is in operation against loads Lo1 to Lo3 correspondingly connected output terminals OUT1 to OUT3 of the constant voltage circuits REG1 to REG3. Therefore, it is possible to suitably operate and control the loads Lo1 to Lo3 based on the information.

Figure 6:
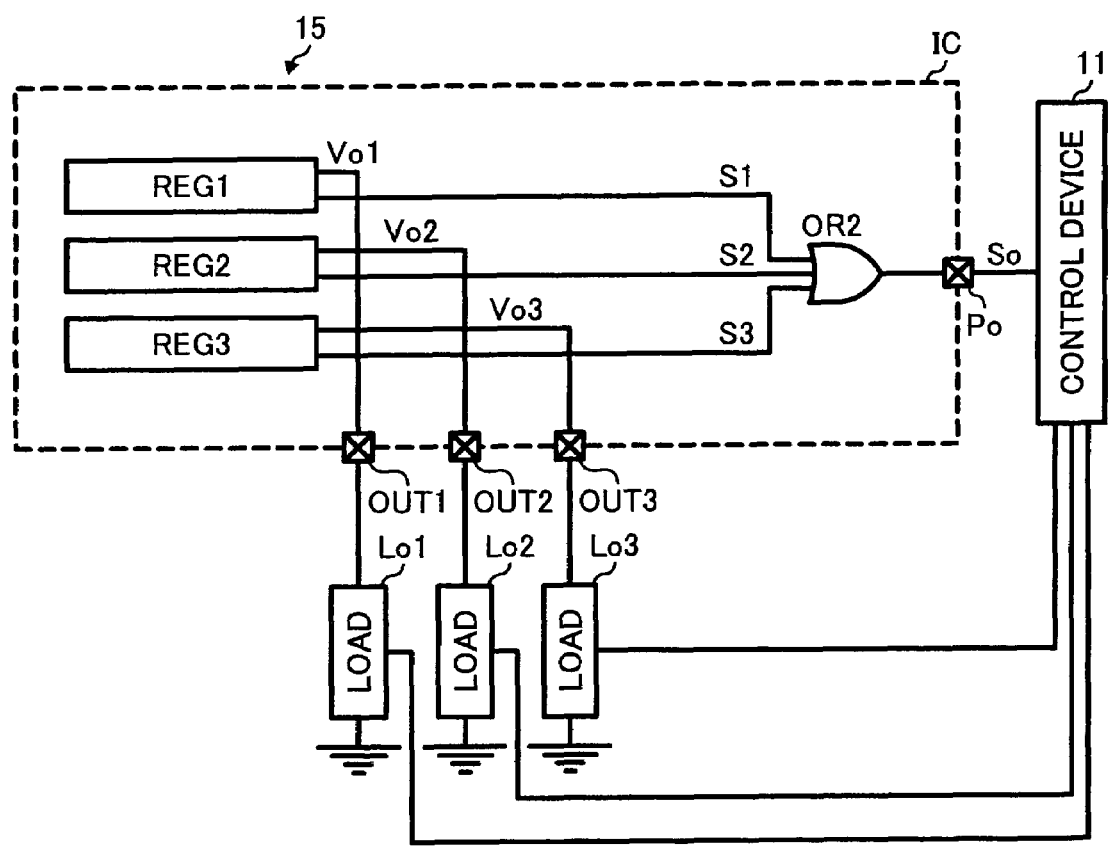
FIG. 6 is a diagram illustrating another example of the system power device constant voltage circuit of the present invention.

In addition, as illustrated in FIG. 6, the signals S1 to S3 output from each constant voltage circuit REG1 to REG3 can be set to be input to the corresponding input end of an OR circuit OR2 and an output signal So from the OR circuit OR2 can be set to be output from the terminal Po to the control device 11 provided outside. The OR circuit OR2 functions as a detection circuit.

On the other hand, as a protection device for a constant voltage circuit adopting a series regulator system, it is typical to use an overcurrent protection circuit for preventing the output current from surpassing the limit thereof and a temperature detection circuit for preventing the temperature of the IC in which constant voltage circuits are integrated from rising above the limit set therefor. The IC can also have such a temperature detection circuit.

Figure 7:
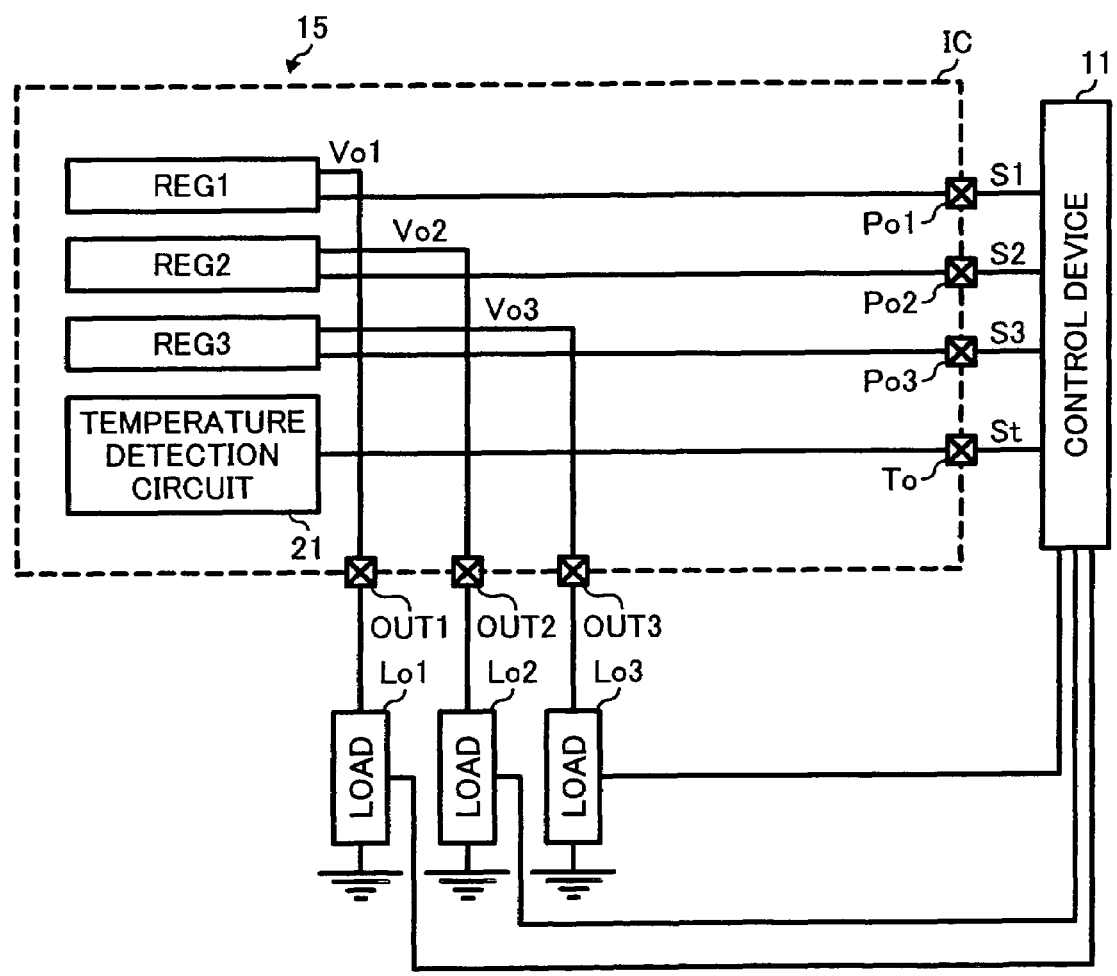
FIG. 7 is a diagram illustrating another example of the system power device constant voltage circuit of the present invention.

FIG. 7 is a block chart illustrating an example of the system power device using the constant voltage circuit for use in the first embodiment of the present invention. The elements in FIG. 7 corresponding to those in FIG. 5 are represented by the same numeral references and not repeatedly described. The description is limited only to the difference therebetween.

The difference between the cases of FIGS. 5 and 7 is that a temperature detection circuit 21 is integrated in the IC of a system power device 15 and accordingly a terminal To is provided to the IC.

When the temperature detected by the IC is in the abnormal range, the temperature detection circuit 21 outputs an abnormal temperature detection signal St, for example, a high level abnormal temperature detection signal St, to the control device 11 via the terminal To. From the signals S1 to S3 from the constant voltage circuits REG1 to REG3 and the abnormal temperature detection signals St, the control device 11 can acquire information on whether the overcurrent protection operation is performed for the loads Lo1 to Lo3 connected to the output terminals of the constant voltage circuits REG1 to REG3. Also, the control device 11 can acquire information on the temperature of the IC and can control the operation on the loads Lo1 to Lo3 based on the information.

In the example illustrated in FIG. 7, the terminals Po1 to Po3 are provided to the IC. The increase in the number of the terminals included in the IC leads to cost increase. To decrease the increase in the number of the terminals in the IC, the OR circuit OR2 illustrated in FIG. 6 is provided to the IC as in the example illustrated in FIG. 8. Thereby, the three terminals Po1 to Po3 can be reduced to one terminal Po to which the output end of the OR circuit OR2 is connected.

Figure 8:
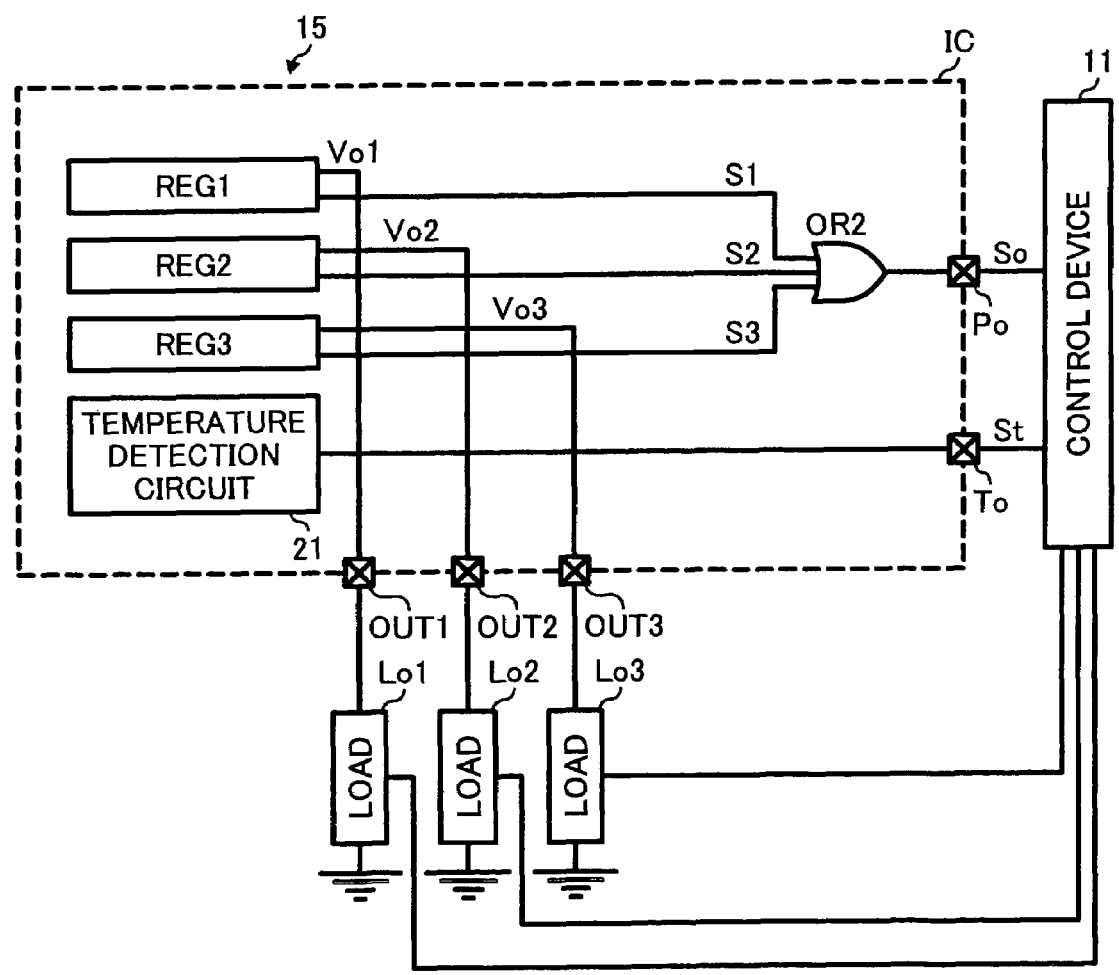
FIG. 8 is a diagram illustrating another example of the system power device constant voltage circuit of the present invention.
Figure 9:
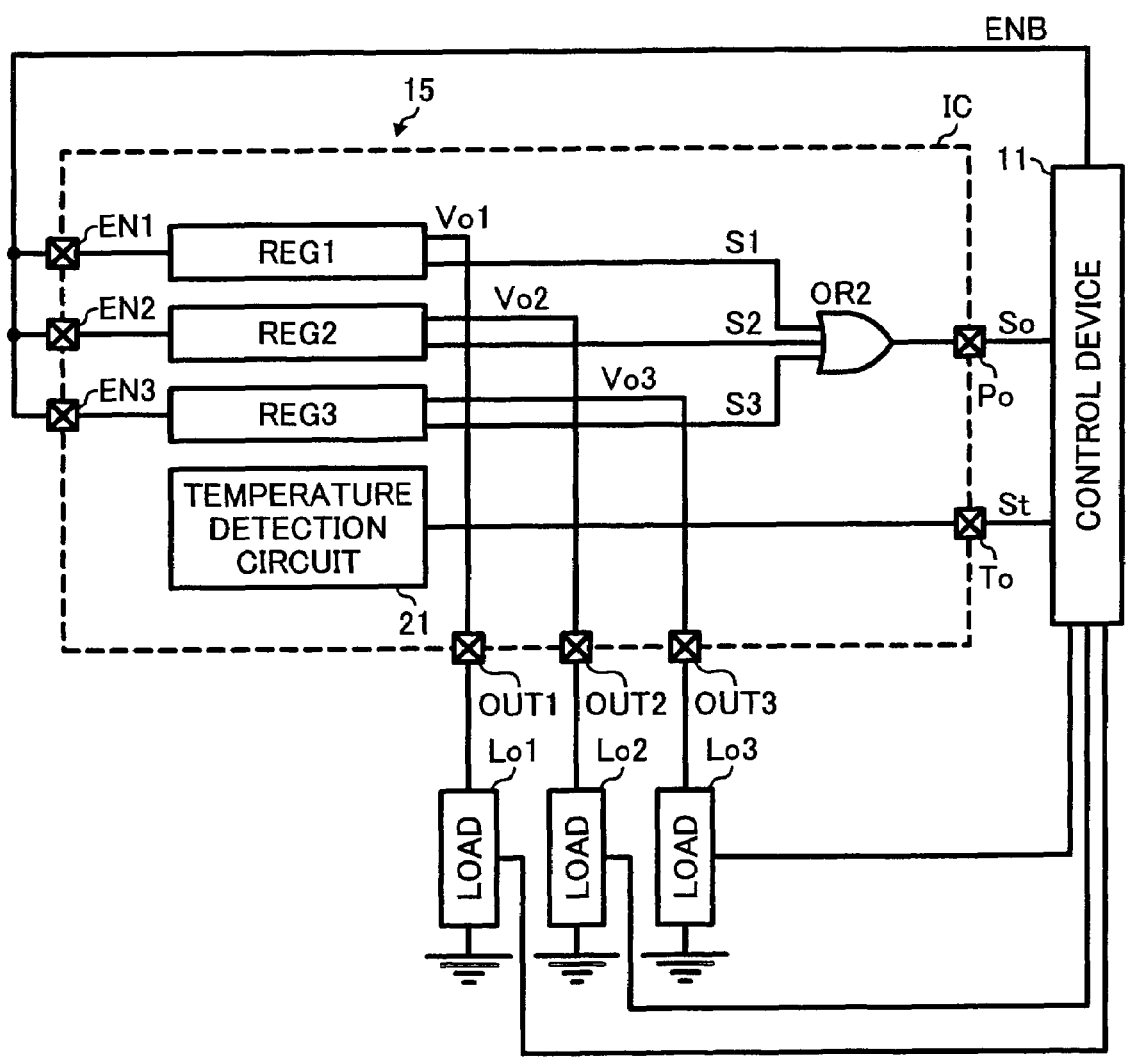
FIG. 9 is a diagram illustrating another example of the system power device constant voltage circuit of the present invention.

In addition, in the example illustrated in FIG. 8, the control device 11 can be set to control the operation of the constant voltage circuits REG1 to REG3 according to the output signal So from the OR circuit OR2 and the abnormal temperature detection signal St, which is illustrated in FIG. 9.

In FIG. 9, the IC includes terminals EN1 to EN3 to which enable signals for the constant voltage circuits REG1 to REG3 are input. The terminals EN1 to EN3 are connected to the corresponding constant voltage circuits REG1 to REG3.

The control device 11 normally outputs signals ENB to the terminals EN1 to EN3 to enable the constant voltage circuits REG1 to REG3. However, when the signal So and the abnormal temperature detection signal St indicate that at least one of the overcurrent protection circuits of the constant voltage circuits REG1 to REG3 performs the overcurrent protection operation and the temperature detection circuit 21 detects the state of abnormal temperature, the control device 11 outputs a signal ENB to each terminal EN1 to EN3 to disable the constant voltage circuits REG1 to REG3 and stops each operation of the constant voltage circuits REG1 to REG3.

Thereby, it is possible to prevent the breakdown of the devices in the middle of the operation of the constant voltage circuits REG1 to REG3 which occurs when each of the constant voltage circuits REG1 to REG3 does not perform overcurrent protection operation and not abnormally emit heat but simply the temperature of the IC rises. In FIG. 7, the control device 11 can be set to control the operation of the constant voltage circuits REG1 to REG3 according to the signals S1 to S3 and the abnormal temperature detection signal St.

In the example illustrated in FIG. 9, the terminals EN1 to EN3 are provided to the IC. The number of the terminals in the IC increases, which leads to a problem of cost increase. To deal with this problem, as in the example illustrated in FIG. 10, a control circuit 25 can be separately provided to the IC for controlling the operation of the constant voltage circuits REG1 to REG3 according to the signals S5 to S3 and the abnormal temperature detection signal St. The output signal So and the abnormal temperature detection signal St are input from the control circuit 25 to the control device 11 via the terminal Po and To. Consequently, the terminals EN1 to EN3 in the example illustrated in FIG. 9 are made to be unnecessary and the number of the terminals in the IC is reduced, which leads to cost reduction.

Figure 10:
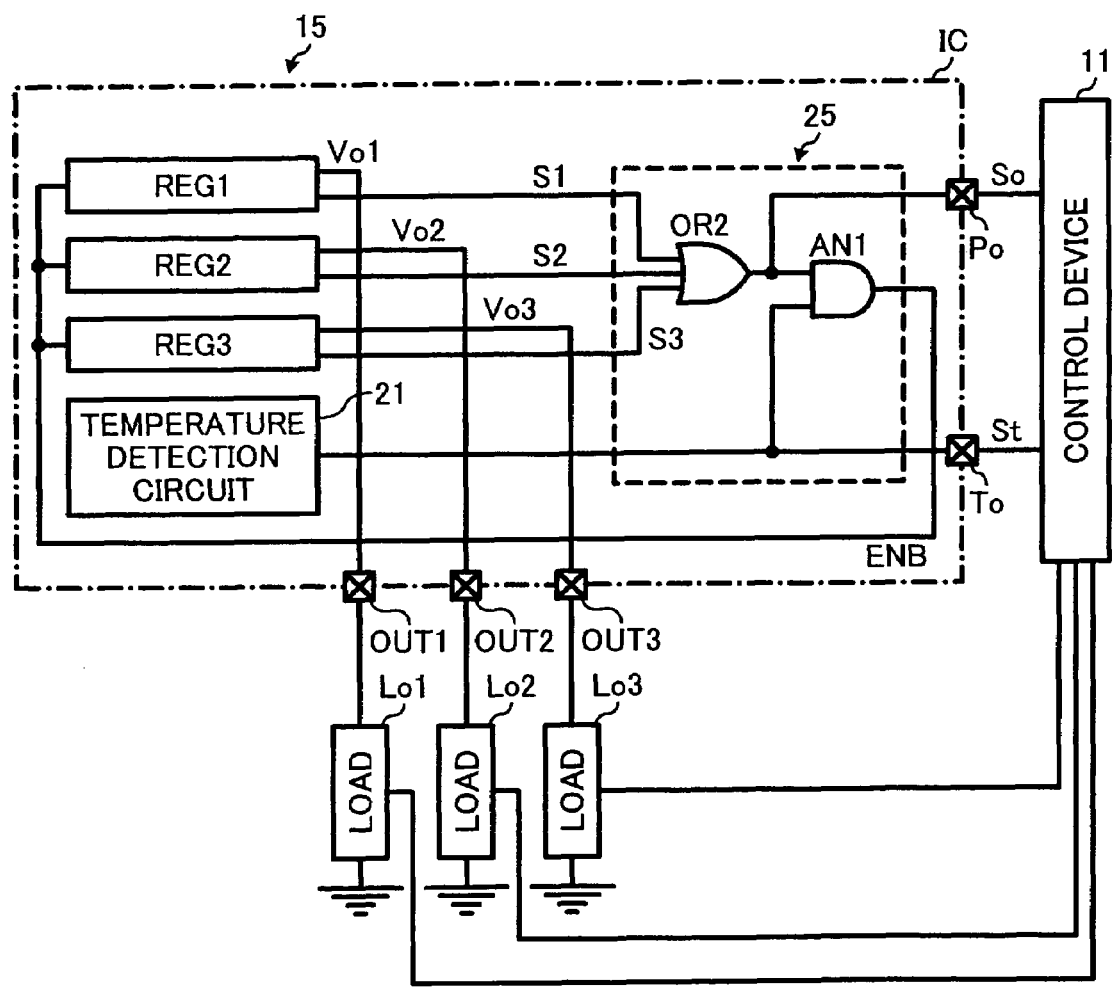
FIG. 10 is a diagram illustrating another example of the system power device constant voltage circuit of the present invention.

In the example illustrated in FIG. 10, the control circuit 25 includes the OR circuit OR2 and an AND circuit AN1. The signals S1 to S3 from the constant voltage circuits REG1 to REG3 are input to each input end of the OR circuit OR2. The output end of the OR circuit OR2 is connected to one input end of the AND circuit AN1. The abnormal temperature detection signal St is input to the other input end of the AND circuit AN1. The enable signal ENB output from the output end of the AND circuit AN1 is output to each of the constant voltage circuits REG1 to REG3. In addition, the output signal So of the OR circuit OR2 is output to the control device 11 via the terminal Po of the IC. The abnormal temperature detection signal St from the temperature detection circuit 21 is output to the control device 11 via the terminal To of the IC.

In the structure described above, when any one signal among the signals S1 to S3 is at a high level and the abnormal temperature detection signal St is at a high level, that is, at least one of the constant voltage circuit REG1 to REG3 performs the overcurrent protection operation and the temperature detection circuit 21 detects an abnormal temperature, a high level enable signal ENB is output from the AND circuit AN1 and the constant voltage circuits REG1 to REG3 become disable and cease the operation. In addition, when all the signals S1 to S3 and/or the abnormal temperature detection signal St indicate the low level, the low level enable signal ENB is output from the AND circuit AN1 and each constant voltage circuit REG1 to REG3 becomes enable and starts operation.

Specific operations of each constant voltage circuit REG1 to REG3 according to enable signals ENB are now described with reference to the constant voltage circuit REG1. The enable signal ENB is input to the error amplifying circuit A1. When the enable signal ENB indicates the high level, the error amplifying circuit A1 ceases its operation and turns off the output transistor M1. When the enable signal ENB is a signal of the low level, the error amplifying circuit A1 is operated and controls the operations of the output transistor M1 in such a manner that the separated voltage Vfb is equal to the reference voltage Vref.

Figure 11:
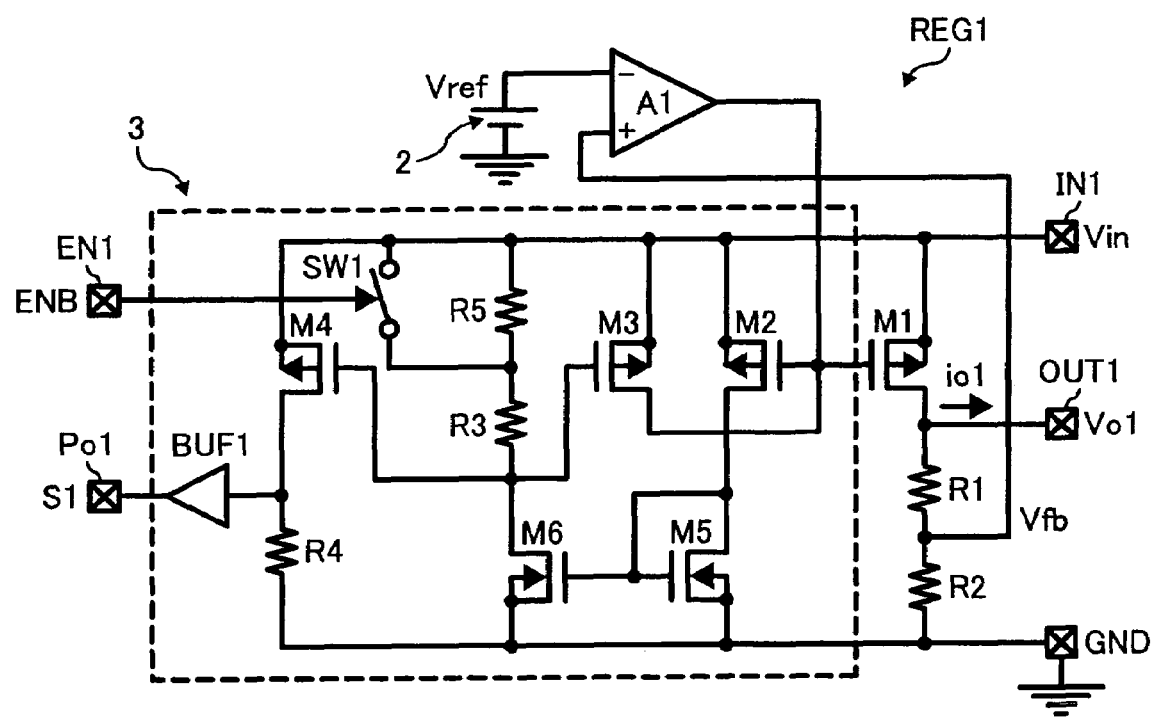
FIG. 11 is a diagram illustrating an example of the constant voltage circuit in the system power device illustrated in FIGS. 10 and 11.
Figure 12:
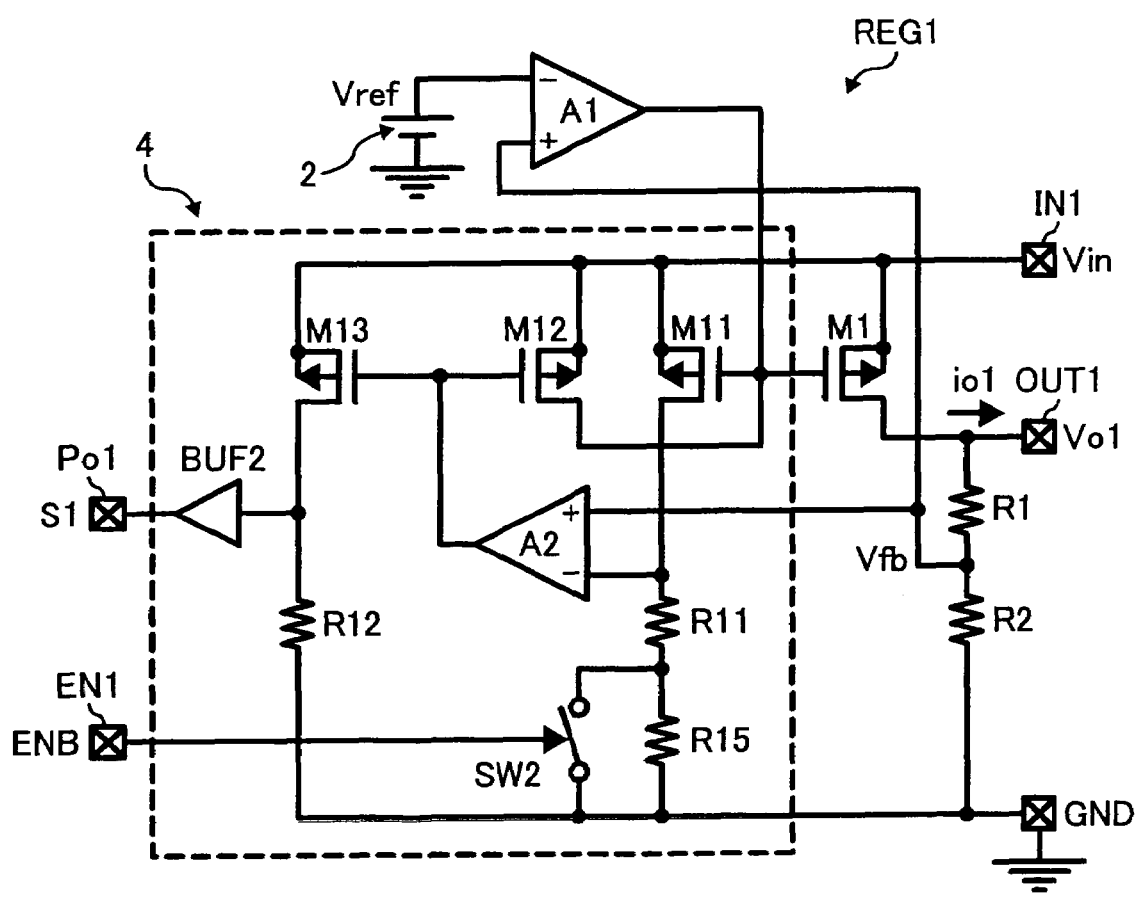
FIG. 12 is a diagram illustrating another example of the constant voltage circuit in the system power device illustrated in FIGS. 10 and 11.
Figure 13:
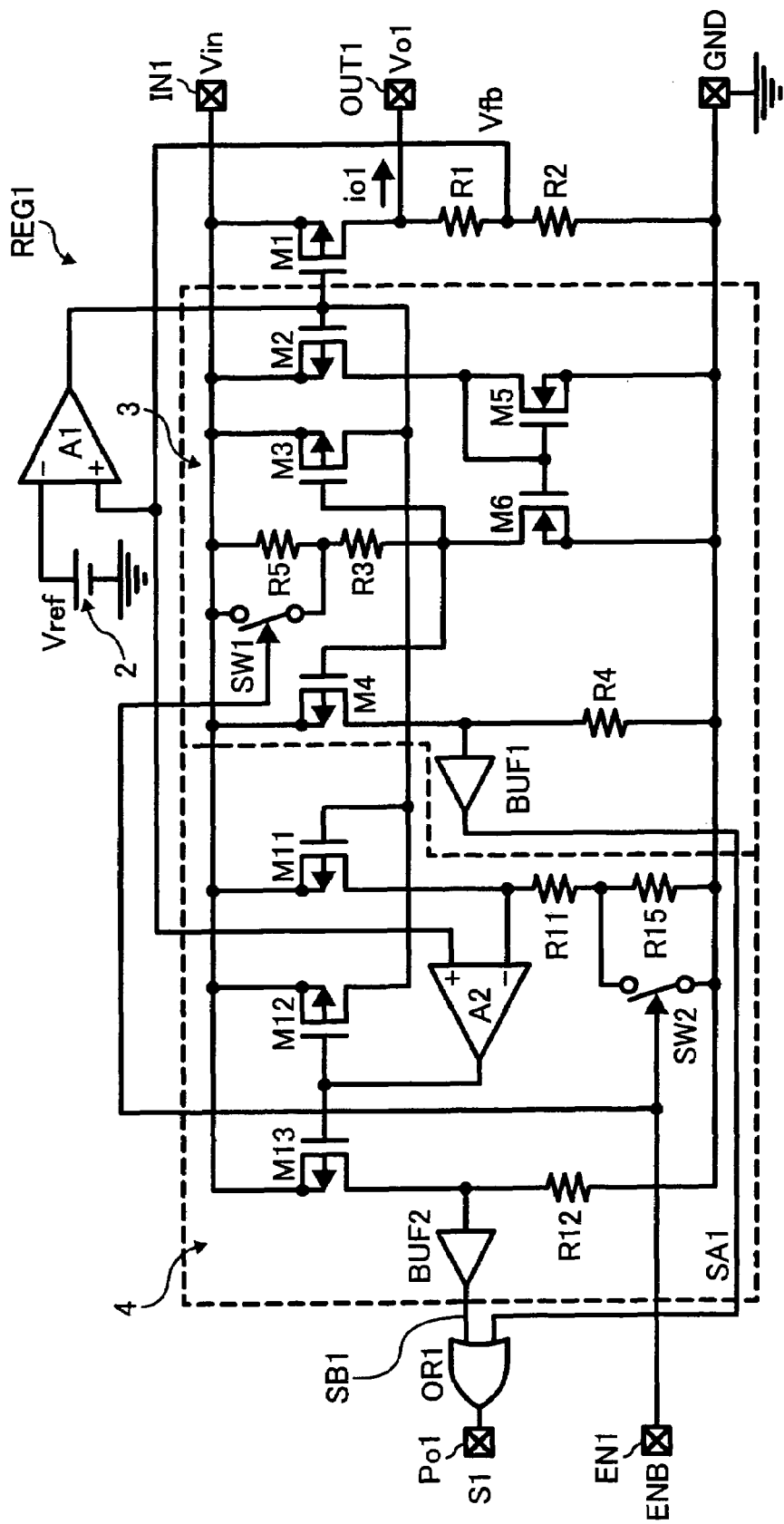
FIG. 13 is a diagram illustrating an example of the constant voltage circuit in the system power device illustrated in FIGS. 10 and 11.
Figure 14:
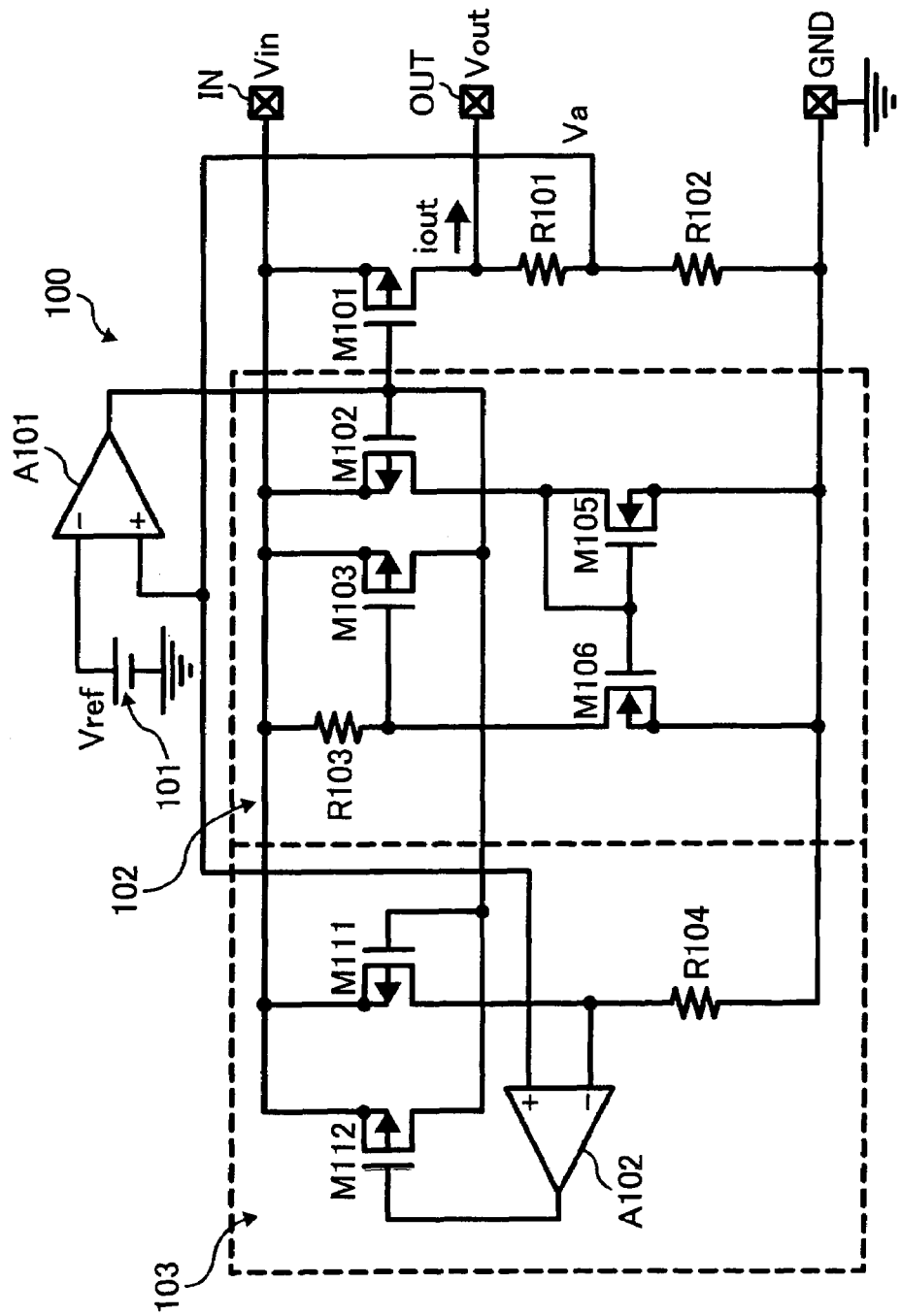
FIG. 14 is a circuit diagram illustrating an example of the constant voltage circuit having an overcurrent protection circuit in the background art.
Figure 15:
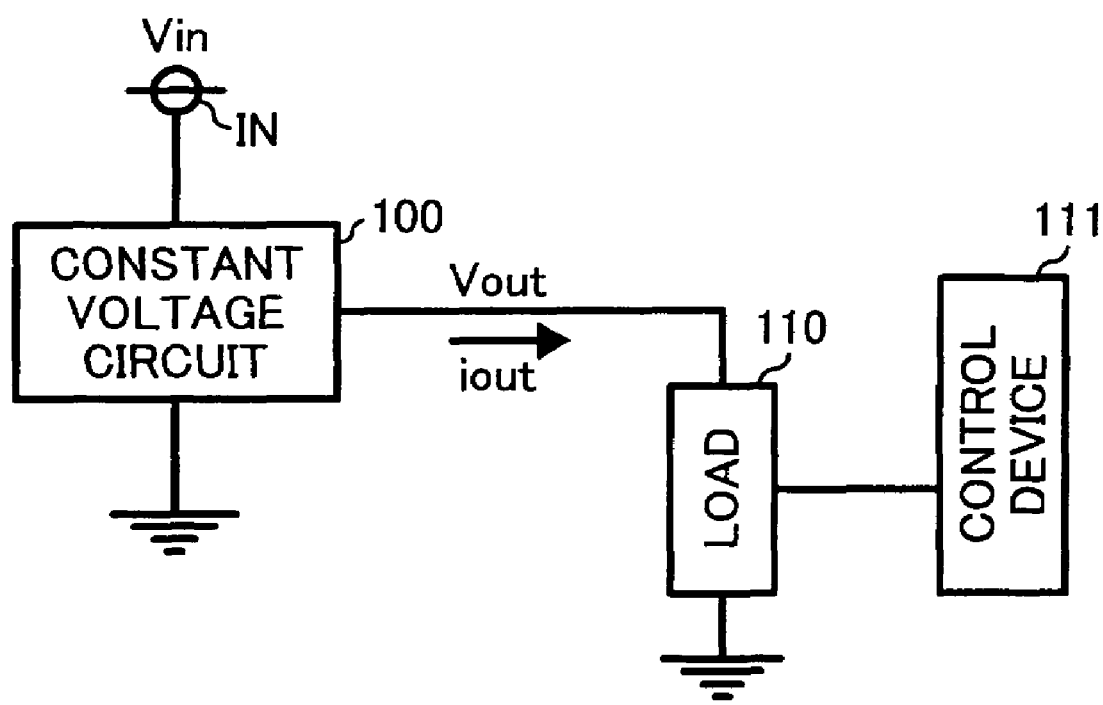
FIG. 15 is a block diagram illustrating an example of the constant voltage circuit illustrated in FIG. 14.

To the contrary, in the descriptions for the examples illustrated in FIGS. 9 and 10, each constant voltage circuit REG1 to REG3 is set to stop its operation when the enable signal ENB is the high level. It is also possible to reduce the amount of heat by lowering the limit for the output current, that is, the output current restriction limit value of the output current restriction circuit and/or the short circuit current limit value of the output current restriction circuit when the enable signal ENB is the high level. Example circuit diagrams of the constant voltage circuits REG1 to REG3 are illustrated in FIGS. 11 to 13. Since the circuits of the constant voltage circuits REG1 to REG3 are the same, the constant voltage circuit REG1 is taken as an example in FIGS. 11 to 13.

In FIG. 11, the constant voltage circuit REG1 having an output current restriction circuit as the overcurrent protection circuit is taken as an example. The elements common in FIGS. 11 and 2 are represented by the same reference numerals and not repeatedly described. The description for the example illustrated in FIG. 11 is limited only to the difference from the example illustrated in FIG. 2.

The difference between the examples illustrated in FIGS. 2 and 11 is that a resistance R5 and a switch SW1 are added in the example of FIG. 11.

In FIG. 11, the resistance R5 is connected between one end of the resistance R3 and the input terminal IN1. The switch SW1 is connected in parallel with R5. The enable signal ENB controls switching of the switch SW1. When the enable signal ENB is the high level, the switch SW1 is turned off. When the enable signal ENB is the low level, the switch SW1 is turned on for electric continuity. Thereby, when the enable signal ENB is the high level, the restriction current of the output current restriction circuit 3 can be lessened so that the amount of heat emitted during the overcurrent protection operation can be decreased.

Next, in FIG. 12, the constant voltage circuit REG1 having a short circuit restriction circuit as the overcurrent protection circuit is taken as an example. The elements common in FIGS. 12 and 3 are represented by the same reference numerals and not repeatedly described. The description for the example illustrated in FIG. 12 is limited only to the difference between the examples illustrated in FIGS. 3 and 12.

The difference between the examples is that a resistance R15 and a switch SW2 are added in the example of FIG. 12.

In FIG. 12, the resistance R15 is connected between one end of the resistance R11 and the grounding terminal GND. The enable signal ENB controls switching of the switch SW2. When the enable signal ENB is the high level, the switch SW2 is turned off. When the enable signal ENB is the low level, the switch SW2 is turned on for electric continuity. Thereby, when the enable signal ENB is the high level, the short circuit current of the short circuit restriction circuit 4 can be lessened so that the amount of heat emitted during the overcurrent protection operation can be decreased.

Next, in FIG. 13, the constant voltage circuit REG1 having both an output current restriction circuit and a short circuit current restriction circuit as the overcurrent protection circuit is taken as an example. The elements common in FIGS. 13 and 4 are represented by the same reference numerals and not repeatedly described. The description for the example illustrated in FIG. 13 is limited only to the differences between the examples illustrated in FIGS. 4 and 13.

The difference between the examples is that the resistances R5 and R15 and the switches SW1 and SW2 are added in the example of FIG. 13.

In FIG. 13, the resistance R5 is connected between one end of the resistance R3 and the input terminal IN1. The switch SW1 is connected in parallel with R5. The resistance R15 is connected between one end of the resistance R11 and the grounding terminal GND. The switch 2 is connected in parallel with the resistance R15.

The enable signal ENB controls switching of the switches SW1 and SW2. When the enable signal ENB is the high level, each switch SW1 and SW2 is turned off. When the enable signal ENB is the low level, each switch SW1 and SW2 is turned on for electric continuity. Thereby, when the enable signal ENB is the high level, the output current restriction value of the output current restriction circuit 3 and the short circuit current value of the short circuit restriction circuit 4 can be lessened so that the amount of heat emitted during the overcurrent protection operation can be decreased.

In FIG. 13, the output current restriction circuit 3 illustrated in FIG. 11 and the short circuit restriction circuit 4 illustrated in FIG. 12 are used as an example. The output current restriction circuit 3 illustrated in FIG. 2 can be used instead of that illustrated in FIG. 11. Also, the short circuit restriction circuit 4 illustrated in FIG. 3 can be used instead of that illustrated in FIG. 12.

The constant voltage circuit of Embodiment No. 1 includes an overcurrent protection circuit and outputs a signal indicating the operation state of the overcurrent protection circuit to the outside. Thereby, the control device 11 for controlling loads to which power is supplied from the constant voltage circuit can detect the state of the loads and suitably control the loads for which overcurrent protection operation is performed. Therefore, it is possible to prevent a drawback which occurs during the normal control for the load in overcurrent protection operation.

In the description above, the system power device 15 includes three constant voltage circuits REG1 to REG3. This is a mere example and the present invention is not limited thereto but applied to the case of a system power device including a plurality of constant voltage circuits. In addition, in the description above, the system power device 15 is integrated in one IC. This is a mere example and the present invention can be applied to the case in which the system power device 15 is not integrated in one IC.

This application claims priority and contains subject matter related to Japanese Patent Application No. 2005-185221 filed on Jun. 24, 2005, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A constant voltage circuit comprising:
   an input terminal configured to receive an input voltage;
   an output terminal configured to output a constant voltage converted from the input voltage to a load; and
   an overcurrent protection circuit portion configured to perform an overcurrent protection operation of restricting an output current from the output terminal within a threshold current and to generate and provide logic signals comprising information on an operation state of the overcurrent protection operation to a control device disposed outside the constant voltage circuit to control the load based on the information,
   wherein the overcurrent protection circuit portion further comprises at least one of an output current restriction circuit and a short circuit current restriction circuit, the output current restriction circuit and the short circuit current restriction circuit each comprising:
      a logic signal transistor having a first source/drain region electrically connected to the input terminal;
      a resistance circuit electrically connected to a second source/drain region of the logic signal transistor; and
      a buffer circuit having an input electrically connected to the second source/drain region of the logic signal transistor and an output configured to provide the information on the operation state of the overcurrent protection operation to the control device.

2. The constant voltage circuit according to claim 1, wherein:
   the output current restriction circuit is configured to restrict the output current within the threshold current when the output current reaches the threshold current and generate and provide logic signals comprising information on an operation state of the output current restriction circuit to the control device; and
   the short circuit current restriction circuit is configured to lower a voltage at the output terminal and the output current when the output current reaches the threshold current in such a manner that the output current when the voltage at the output terminal decreases to a grounding voltage is equal to a predetermined short circuit current and generate and provide logic signals comprising information on an operation state of the short circuit current restriction circuit to the control device.

3. The constant voltage circuit according to claim 2, further comprising an operation state detection circuit configured to generate and provide logical signals to the control device when at least one of the output current restriction circuit and the short circuit current restriction circuit are turned on.

4. The constant voltage device according to claim 1, further comprising:
   an output voltage control portion configured to generate a reference voltage and a proportion voltage in proportion to the voltage at the output terminal and control an output transistor in such a manner that the proportion voltage is equal to the reference voltage,
   wherein the overcurrent protection circuit portion restricts the output current from the output transistor.

5. The constant voltage device according to claim 4, wherein the output transistor, the output voltage control portion and the overcurrent protection circuit portion are integrated in one integrated circuit.

6. A system power device comprising:
   at least two constant voltage circuits, each of which comprises:
      an input terminal configured to supply an input voltage;
      an output terminal configured to output a constant voltage converted from the input voltage to a load; and
      an overcurrent protection circuit portion configured to perform an overcurrent protection operation of restricting an output current from the output terminal within a threshold current and to generate and provide logic signals comprising information on an operation state of the overcurrent protection operation to a control device disposed outside the constant voltage circuit to control the load based on the information,
      wherein the overcurrent protection circuit portion further comprises at least one of an output current restriction circuit and a short circuit current restriction circuit. the output current restriction circuit and the short circuit current restriction circuit each comprising:
         a logic signal transistor having a first source/drain region electrically connected to the input terminal;
         a resistance circuit electrically connected to a second source/drain region of the logic signal transistor; and
         a buffer circuit having an input electrically connected to the second source/drain region of the logic signal transistor and an output configured to provide the information on the operation state of the overcurrent protection operation to the control device.

7. The system power device according to claim 6, wherein:
   the output current restriction circuit is configured to restrict the output current within the threshold current when the output current reaches the threshold current and generate and provide logic signals comprising information on an operation state of the output current restriction circuit to the control device; and
   the short circuit current restriction circuit is configured to lower a voltage at the output terminal and the output current when the output current reaches the threshold current in such a manner that the output current when the voltage at the output terminal decreases to a grounding voltage is equal to a predetermined short circuit current and generate and provide logic signals comprising information on an operation state of the short circuit current restriction circuit to the control device.

8. The system power device according to claim 7, wherein the overcurrent protection circuit portion further comprises an operation state detection circuit configured to generate and provide logical signals to the control device when at least one of the output current restriction circuit and the short circuit current restriction circuit are turned on.

9. The system power device according to claim 6, wherein each constant voltage circuit further comprises an output voltage control portion configured to generate a reference voltage and a proportion voltage in proportion to the voltage at the output terminal and control an output transistor in such a manner that the proportion voltage is equal to the reference voltage and the overcurrent protection circuit portion restricts the output current from the output transistor.

10. The system power device according to claim 6, further comprising a detection circuit configured to detect an operation state of the overcurrent circuit portion of each constant voltage circuit and output logic signals when at least one overcurrent circuit portion thereof are turned on.

11. The system power device according to claim 6, further comprising a temperature detection circuit configured to detect a temperature of perimeter of each constant voltage circuit and generate and output a signal on whether the detected temperature is higher than a threshold temperature.

12. The system power device according to claim 11, further comprising a control circuit configured to stop the operation of each constant voltage circuit when the temperature of each constant voltage circuit detected by the temperature detection circuit is not lower than the threshold temperature while at least one of the overcurrent protection circuit portions of the constant voltage circuits are turned on.

13. The system power device according to claim 11, further comprising a control circuit configured to control each overcurrent protection circuit portion in respective constant voltage circuit such that the threshold current for the output current of the overcurrent protection circuit is reduced when the temperature of each constant voltage circuit detected by the temperature detection circuit is not lower than the threshold temperature while at least one of the overcurrent protection circuit portions of the constant voltage circuits are turned on.

14. The system power device according to claim 6, wherein each constant voltage circuit is integrated in one integrated circuit.

15. The system power device according to claim 10, wherein each constant voltage circuit and detection circuit are integrated in one integrated circuit.

16. The system power device according to claim 10, further comprising:
a temperature detection circuit configured to detect a temperature of each constant voltage circuit and generate and output a signal on whether the detected temperature is not lower than a threshold temperature,
wherein each constant voltage circuit, detection circuit and temperature detection circuit are integrated in one integrated circuit.

17. The system power device according to claim 10, further comprising:
a temperature detection circuit configured to detect a temperature of each constant voltage circuit and generate and output a signal on whether the detected temperature is not lower than a threshold temperature; and
a control circuit configured to stop the operation of each constant voltage circuit when the temperature of the perimeter of each constant voltage circuit detected by the temperature detection circuit is not lower than the threshold temperature while at least one of the overcurrent protection circuit portions of the constant voltage circuits are turned on,
wherein each constant voltage circuit, detection circuit, temperature detection circuit and control circuit are integrated in one integrated circuit.

18. The system power device according to claim 10, further comprising:
a temperature detection circuit configured to detect a temperature of each constant voltage circuit and generate and output a signal on whether the detected temperature is not lower than a threshold temperature; and
a control circuit configured to control each overcurrent protection circuit portion in respective constant voltage circuit such that the threshold current for the output current of the overcurrent protection circuit is reduced when the temperature of each constant voltage circuit detected by the temperature detection circuit is not lower than the threshold temperature while at least one of the overcurrent protection circuit portions of the constant voltage circuits are turned on,
wherein each constant voltage circuit, detection circuit, temperature detection circuit and control circuit are integrated in one integrated circuit.

19. A method of controlling a system power device comprising a plurality of the constant voltage circuits of claim 1, said method comprising:
detecting a temperature of each constant voltage circuit; and
stopping operation of each constant voltage circuit when the detected temperature is not lower than a threshold temperature and at least one of the constant voltage circuit performs overcurrent protection operation.

20. A method of controlling a system power device comprising a plurality of the constant voltage circuits of claim 1, said method comprising:
detecting a temperature of each constant voltage circuit; and
controlling operations of each constant voltage circuit such that a threshold current for the output current of the overcurrent protection circuit is reduced when the detected temperature of each constant voltage circuit is not lower than a threshold temperature while at least one of the overcurrent protection circuit portions of the constant voltage circuits are turned on.

* * * * *